(12) United States Patent
Huang et al.

(10) Patent No.: US 8,611,428 B1
(45) Date of Patent: Dec. 17, 2013

(54) TRANSPARENT INSERTION OF MULTIMEDIA CONTENT IN REAL-TIME STREAMING SESSIONS

(75) Inventors: Alex Xueyuan Huang, Cupertino, CA (US); Carl Ludewig, San Rafael, CA (US)

(73) Assignee: Velti USA, Inc., San Francisco, CA (US)

( * ) Notice: Subject to any disclaimer, the term of this patent is extended or adjusted under 35 U.S.C. 154(b) by 967 days.

(21) Appl. No.: 12/116,961

(22) Filed: May 8, 2008

(51) Int. Cl.
*H04B 1/66* (2006.01)
*H04N 7/12* (2006.01)
*H04N 11/02* (2006.01)
*H04N 11/04* (2006.01)
*H04N 21/2365* (2011.01)

(52) U.S. Cl.
CPC ................................ *H04N 21/2365* (2013.01)
USPC ............ 375/240.26; 725/32; 725/34; 725/35; 725/36; 725/42; 375/240; 375/240.01; 705/14.4

(58) Field of Classification Search
None
See application file for complete search history.

(56) References Cited

U.S. PATENT DOCUMENTS

| | | | |
|---|---|---|---|
| 6,614,808 B1* | 9/2003 | Gopalakrishna | 370/469 |
| 7,043,564 B1* | 5/2006 | Cook et al. | 709/246 |
| 7,096,488 B1* | 8/2006 | Zhang et al. | 725/105 |
| 7,583,733 B1* | 9/2009 | Zhang et al. | 375/240.26 |
| 7,797,441 B1* | 9/2010 | Barnes et al. | 709/231 |
| 8,218,651 B1* | 7/2012 | Eshet et al. | 375/240.26 |
| 8,424,036 B2* | 4/2013 | Haberman et al. | 725/34 |
| 2002/0120498 A1* | 8/2002 | Gordon et al. | 705/14 |
| 2002/0178445 A1* | 11/2002 | Eldering et al. | 725/32 |
| 2003/0018966 A1* | 1/2003 | Cook et al. | 725/2 |
| 2005/0091682 A1* | 4/2005 | Czeck | 725/32 |
| 2005/0283797 A1* | 12/2005 | Eldering et al. | 725/35 |
| 2006/0031892 A1* | 2/2006 | Cohen | 725/88 |
| 2006/0287912 A1* | 12/2006 | Raghuvamshi | 705/14 |
| 2007/0094081 A1* | 4/2007 | Yruski et al. | 705/14 |
| 2007/0234207 A1* | 10/2007 | Turakhia | 715/530 |
| 2007/0276726 A1* | 11/2007 | DiMatteo | 705/14 |
| 2007/0283384 A1* | 12/2007 | Haeuser et al. | 725/34 |
| 2007/0294292 A1* | 12/2007 | Hydrie et al. | 707/104.1 |
| 2007/0294423 A1* | 12/2007 | Brockenbrough et al. | 709/231 |
| 2007/0294772 A1* | 12/2007 | Hydrie et al. | 726/27 |
| 2007/0294773 A1* | 12/2007 | Hydrie et al. | 726/27 |
| 2008/0120364 A1* | 5/2008 | Chari et al. | 709/203 |

(Continued)

OTHER PUBLICATIONS

Schulzrinne, H. et al., RFC 2326, Apr. 1998, Real Time Streaming Protocol (RTSP).

(Continued)

*Primary Examiner* — Ayaz Sheikh
*Assistant Examiner* — Peter Chau
(74) *Attorney, Agent, or Firm* — K&L Gates LLP

(57) ABSTRACT

An example embodiment of the present invention provides a process for inserting a source media stream into a target media stream, which media streams might be in container file format. The process opens and reads into memory structural information from a target media stream and structural information from a source media stream. The process then finds the nearest prior key frame to an insertion time and splits a chunk of media samples if the key frame's sample is not at the beginning of a chunk. The process adjusts the structural information for both streams in order to effect the mid-roll insertion of the source media stream into the target media stream. The process then writes onto an output media stream the adjusted structural information for the source and target media streams and then pipes onto the output media stream the media data for the source and target media streams.

14 Claims, 8 Drawing Sheets

(56) References Cited

U.S. PATENT DOCUMENTS

| | | |
|---|---|---|
| 2008/0189735 A1* | 8/2008 | Barton et al. .................... 725/32 |
| 2008/0235722 A1* | 9/2008 | Baugher et al. ................. 725/32 |
| 2009/0003432 A1* | 1/2009 | Liu et al. ................... 375/240.01 |
| 2009/0031339 A1* | 1/2009 | Pickens et al. .................. 725/32 |
| 2009/0083144 A1* | 3/2009 | Menditto et al. ................ 705/14 |
| 2009/0094634 A1* | 4/2009 | Haberman et al. .............. 725/32 |
| 2009/0094639 A1* | 4/2009 | Haberman et al. .............. 725/34 |
| 2009/0150926 A1* | 6/2009 | Schlack .......................... 725/34 |
| 2009/0199236 A1* | 8/2009 | Barrett et al. ................... 725/36 |
| 2009/0257435 A1* | 10/2009 | Karlsson et al. .............. 370/394 |
| 2010/0030692 A1* | 2/2010 | Turakhia ......................... 705/50 |
| 2013/0067510 A1* | 3/2013 | Ahanger et al. ................ 725/34 |

OTHER PUBLICATIONS

Schulzrinne, H. et al., RFC 3550, Jul. 2003, RTP: A Transport Protocol for Real-Time Applications.

\* cited by examiner

US 8,611,428 B1

TRANSPARENT INSERTION OF MULTIMEDIA CONTENT IN REAL-TIME STREAMING SESSIONS

TECHNICAL FIELD

The present disclosure relates to the insertion of source streaming media content into target streaming media content.

BACKGROUND OF THE INVENTION

Streaming multimedia is multimedia that is constantly received by, and normally displayed to, the end-user while it is being delivered by the provider. The Real-time Transport Protocol (or RTP) defines a standardized packet format for delivering audio and video over the Internet. It was developed by the Audio-Video Transport Working Group of the IETF and first published in 1996 as RFC 1889, which was made obsolete in 2003 by RFC 3550. It is frequently used in streaming media systems in conjunction with the Real Time Streaming Protocol (RTSP), developed by the IETF and created in 1998 as RFC 2326. RTSP is a protocol that allows a client to remotely control a streaming media server, issuing VCR-like commands such as "play" and "pause." The Real-time Transport Protocol (RTP) and the Real-time Transport Control Protocol (RTCP) are commonly used together. RTP is used to transmit data (e.g. audio and video) and RTCP is used to monitor Quality of Service (QoS).

SUMMARY OF THE INVENTION

In particular implementations, the present invention provides methods, apparatuses and systems directed to real-time insertion of source streaming media content into target streaming media content. In particular implementations, the present invention can be configured as a proxy that transparently inserts source streaming media content into target streaming media content. In a particular implementation, target streaming media content may be a music video or animation, while source streaming media content may be advertisements.

DETAILED DESCRIPTION OF EXAMPLE EMBODIMENTS

The following example embodiments are described and illustrated in conjunction with apparatuses, methods, and systems which are meant to be examples and illustrative, not limiting in scope. For example, the network environment set forth below is provided for didactic purposes to illustrate how one particular implementation of the invention may be deployed.

A. Example Network Environment

Figure 1:
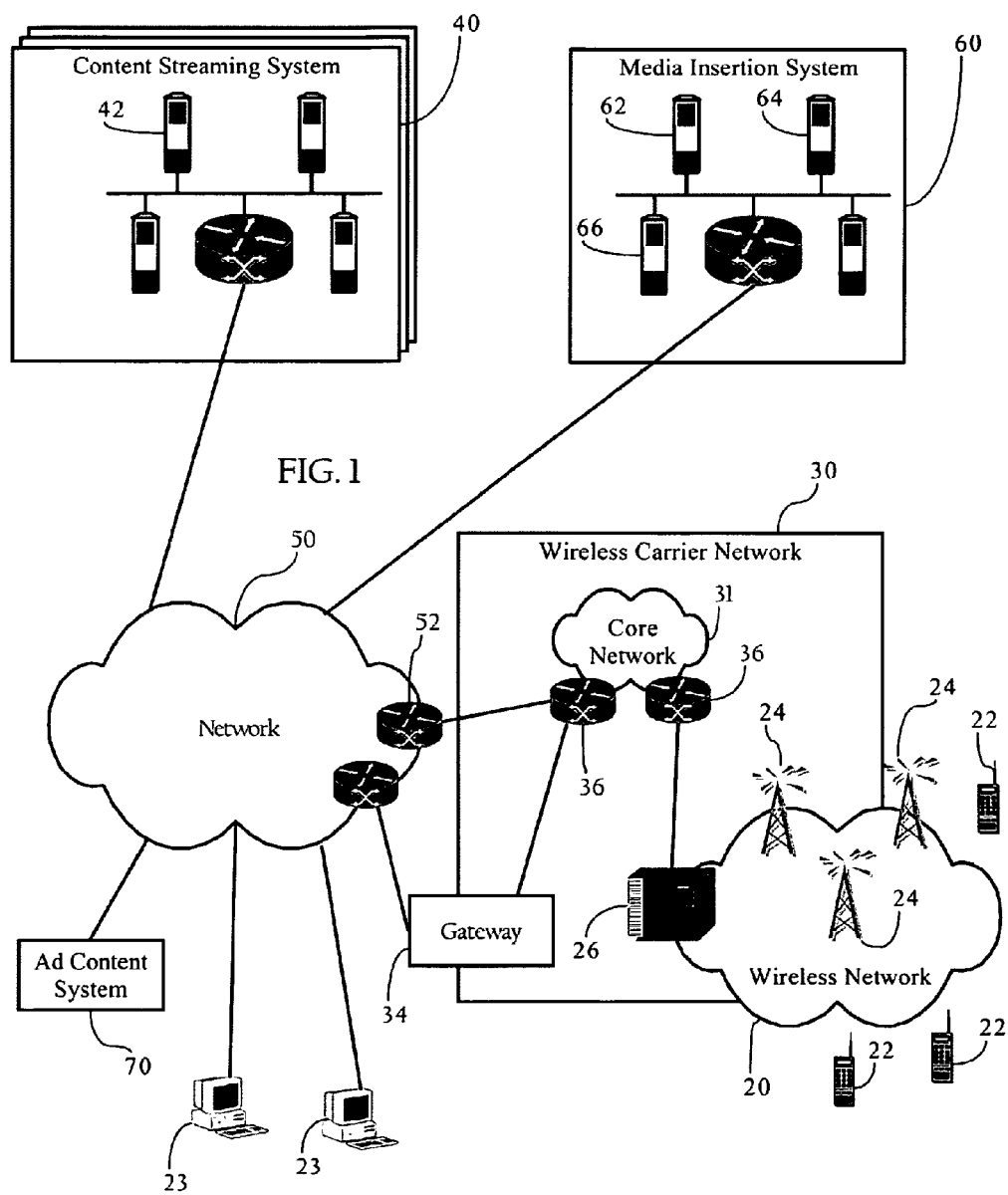
FIG. 1 is a block diagram illustrating a computer network environment in which embodiments of the present invention might operate.

FIG. 1 is a functional block diagram illustrating a network environment in which embodiments of the present invention may operate. Content streaming system 40 is a network addressable system that hosts streaming content, and includes one or more content streaming servers 42 operative to stream multimedia content to client devices, such as wireless mobile stations 22 and computers 23. Ad content system 70 hosts streaming multimedia ad content, and may include one or more content streaming servers (not shown) as well. Media insertion system 60 is a network addressable system that includes one or more ad streaming servers 62 and one or more streaming media insertion servers 64.

As FIG. 1 illustrates, in one embodiment, the present invention may operate in connection with one or more wireless carrier networks 30 and/or packet data network 50. Packet data network 50 is a packet-switched network, such as the Internet or an intranet. In one embodiment, external packet data network 50 is an Internet Protocol (IP) network; however, packet data network 50 can employ any suitable network layer and/or routing protocols. As FIG. 1 illustrates, packet data network 50 includes at least one routing device 52 for the routing of datagrams or packets transmitted between end systems. Computers 23 can connect to network 50 through an internet service provider or a local area network that is connected to network 50.

Wireless carrier network 30 enables one or more wireless mobile stations 22 to establish connections with remote devices, such as other mobile stations, POTS telephones, and computing resources (e.g., content streaming system 40 and media insertion system 60) on packet data network 50, for the transmission of voice, video, music files, or other data. In one embodiment, wireless network 20 includes at least one base station 24 (or other radio transmit/receive unit) operably connected to a base station controller 26 (e.g., a Base Station Controller (BSC), a Radio Network Controller (RNC), etc.).

The present invention can be deployed in connection with one to a plurality of wireless network types. For example, wireless network 20 may be a cellular or Personal Communication System (PCS) network employing several possible technologies, including Time Division Multiple Access (TDMA), Code Division Multiple Access (CDMA), and Frequency Division Multiple Access (FDMA) communication. Communication of data between mobile stations 22 and a gateway to packet data network 50 can occur over any suitable bearer service. In one embodiment, mobile stations 22 can establish circuit-switched or dial-up connections to a gateway associated with the wireless carrier. For example, in GSM networks, Short Message Service (SMS) or Circuit-Switched Data (CSD) bearer services may be used. In addition, mobile stations or terminals 22 may establish packet-switched connections to a gateway using General Packet Radio Services (GPRS) bearer services. Other bearer service types may include High-Speed Circuit-Switched Data (HSCSD), Enhanced Data GSM Environment (EDGE). Wireless network 20 can also be a Universal Mobile Telecommunications Service (UMTS) network enabling broadband, packet-based transmission of text, digitized voice, video, and multimedia.

Core network 31 includes functionality supporting operation of the wireless network 20, as well as functionality integrating circuit- and packet-switched network traffic. In one embodiment, core network 31 comprises at least one routing device, such as router 36, to route data packets between nodes connected to the core network 31. Core network 31 may include at least one Gateway GPRS Support Node (GGSN), and at least one Serving GPRS Support Node (SGSN). Gateway GPRS Support Nodes support the edge routing function of the core network 31. To external packet data networks, such as network 50, GGSNs performs the task of an IP router. In one embodiment, the GGSNs may also include firewall and filtering functionality, to protect the integrity of the core network 31. An SGSN, in one embodiment, connects a base station controller 24 to core network 31. The SGSN, in one embodiment, keeps track of the location of an individual mobile station 22 and performs security functions and access control. Of course, one of ordinary skill in the art will recognize that the systems employed within, and the functionality of, core network 31 depend on the wireless network type(s) that it supports.

In one embodiment, core network 31 includes a cellular operator server farm comprising at least one server or other computing device implementing functionality associated with, enabling, and/or facilitating operation of wireless network 20. For example, the cellular operator server farm, in one embodiment, comprises a signaling gateway and a Home Location Register (HLR). The operator server farm may further include a Visitor Location Register (VLR), DNS servers, WAP gateways, email servers and the like. Core network 31 may further include media gateway 34, a device that facilitates, proxies and/or intermediates connections between mobile stations 22 and content streaming servers. For example, media gateway 34 may monitor streaming sessions between clients and servers and perform various media stream processing operations. In some implementations, media gateway 34 may transcode media streams and cache the transcoded streams for use in connection with subsequent requests.

Mobile stations 22 can be any suitable mobile or portable electronic or computing device. Typically, a mobile device includes one or more processors, a memory, a display and a user interface. The mobile station 22 further includes one or more mechanisms allowing for the exchange of data, such as a wireless network interface, a Bluetooth interface, a serial port, a Universal Serial Bus adapter, and the like. Examples of mobile stations are cellular telephones, wireless email devices, handheld gaming devices, personal digital assistants, and multimedia players (such as the iPod offered by Apple Computer Inc. of Cupertino, Calif.). Mobile stations 22 may also host one or more streaming client applications, such as a multimedia player.

Media insertion system 60 can be configured to facilitate the deployment of ad campaigns directed to mobile stations 22 and/or computers 23 over one or more distribution channels. Media insertion system 60 may include, or operate in connection with, a matching engine 66 that selects one or more ads for insertion into a target multimedia stream. Ad insertion server 64 is operative, as discussed below, to insert ad content into target content, such as multimedia files and the like. Matching engine 66 is operative to identify one or more ads for insertion into target content. Ad server 62 is operative to stream multimedia content to one or more media stream clients. In some implementations, media insertion system 60 may host the ad or other streaming multimedia content that is inserted into target content. In other implementations, the multimedia content to be inserted into target content can be hosted remotely from media insertion system 60. Media insertion system 60 may also include load balancers to arbitrate or balance load among multiple insertion servers 64. Media insertion system 60 may also'include HTTP servers and other functionality that allows for the uploading of ad content and target user profile data that can be used to select ads. Still further, the media insertion system 60 may also reside within the carrier network and operably connected to core network 31.

B. Example Media Stream Insertion Operations

Figure 2:
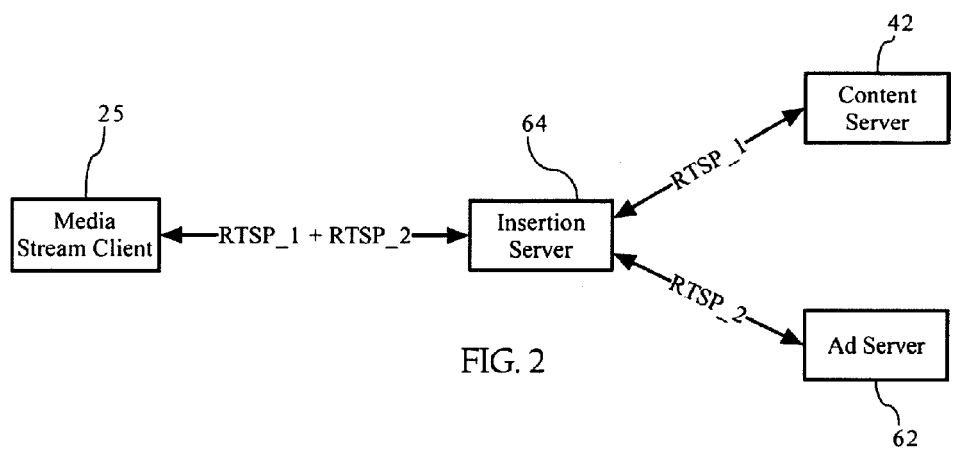
FIG. 2 is a diagram graphically illustrating operation of an insertion server.

FIG. 2 illustrates operation of insertion server 64 relative to a media stream client 25 (hosted on either a mobile station 22 or a computer 23) and two or more content streaming servers (here, content server 42 and ad server 62). Multimedia content typically involves a video stream and a separate audio stream which are synchronized at the media stream client using various stream parameters, such as RTP and NTP time stamps. Each of the audio and video stream have their own RTP, RTSP and RTCP connections and messages. The stream insertion operations discussed herein are performed for each of the audio and video streams separately. In a particular implementation, requests for streaming media from media stream client 25 are transmitted to insertion server 64. For example, a request for content hosted by content streaming system 40 is directed to insertion server 64. This can be accomplished, for example, by redirection messages or by having the URLs corresponding to the streams be directed at media insertion system 60. As discussed below, insertion server 64 establishes streaming sessions with two or more streaming servers (as illustrated, content server 42 and ad server 62) and transparently inserts streaming content from one streaming server into target content of another streaming server. In a particular implementation, insertion server 64 processes and modifies various streaming protocol messages and data fields to transparently combine the streams.

Figure 3:
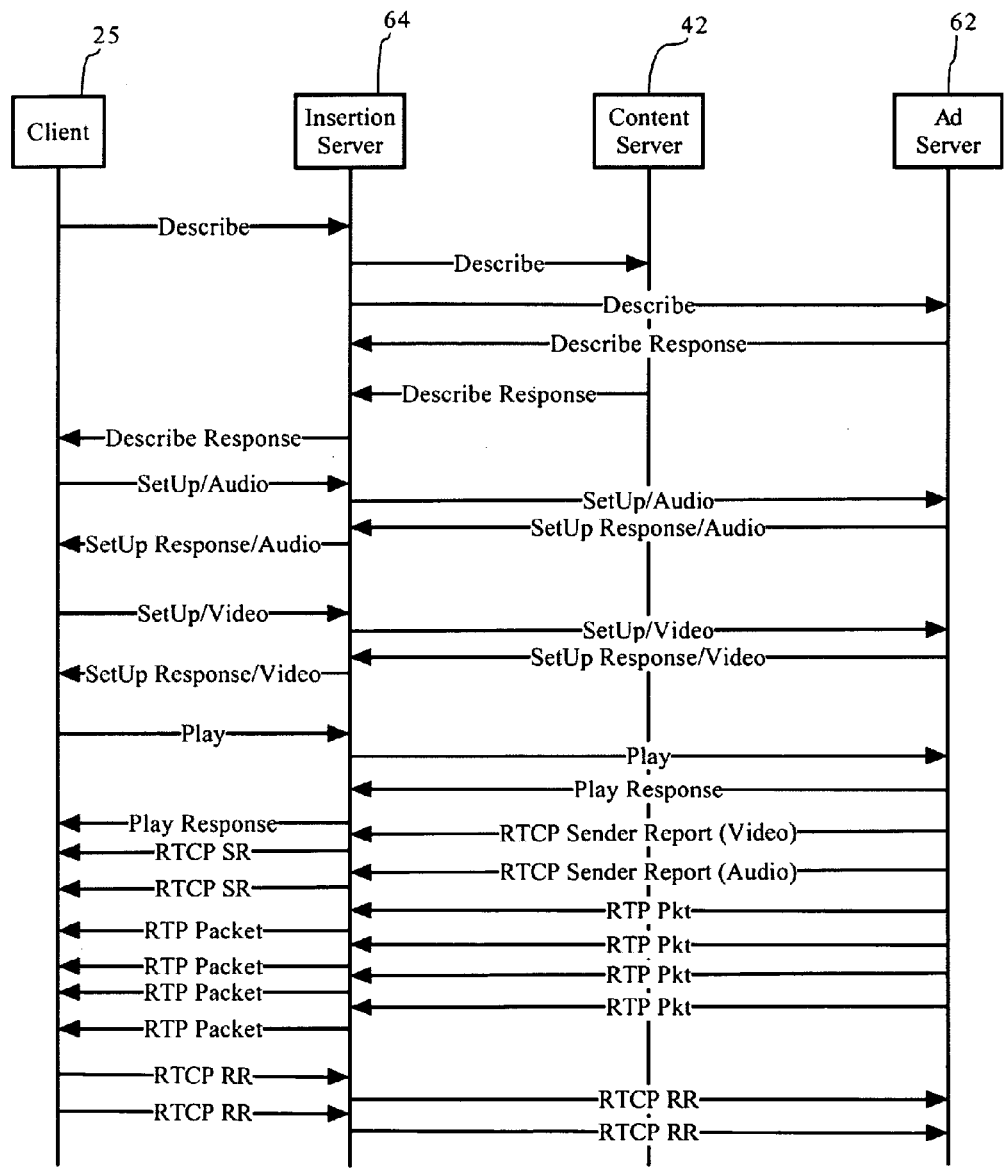
FIG. 3 is a stick diagram illustrating an example message flow between hosts.
Figure 4:
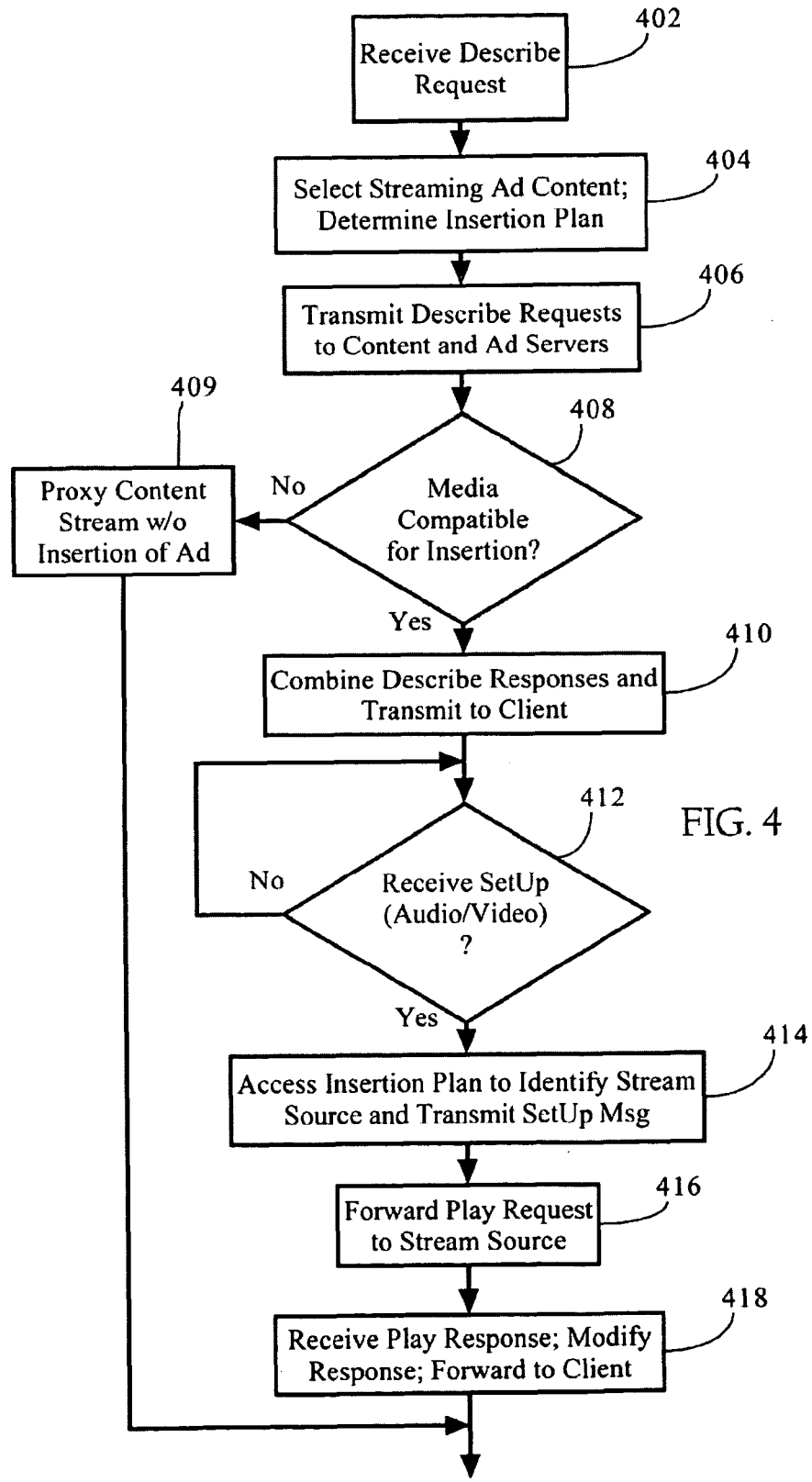
FIG. 4 is a flow chart providing an example method implemented by an insertion server.

FIG. 3 is a stick diagram illustrating an example message flow according to one possible implementation of the invention. The embodiments described can be configured to operate in connection with the Real Time Streaming Protocol described in RFC 2326 and the RTP protocol disclosed in RFC 3550 (see above). Additionally, FIG. 4 illustrates a process executed at insertion server 64 for processing messages of the message flow illustrated in FIG. 3.

Figure 9:
FIG. 9 provides an example insertion plan.

To initiate a streaming session, a media stream client 25 may transmit a DESCRIBE request which is received by insertion server 64. The DESCRIBE request identifies a multimedia stream hosted by content server 42. In a separate process, one or more ads are selected for insertion into the target multimedia stream hosted by content server 42 (404). In addition, an insertion plan is also generated and returned to insertion server 64. FIG. 9 graphically illustrates an example insertion plan for didactic purposes. An insertion plan, in one particular implementation, describes at what points in time ad content (A1, A2, A3) or other content is to be inserted into target streaming content (TC) of the content server 42. For example, the insertion plan can indicate that a given ad stream is to be inserted at the beginning (A1—pre-roll), in the middle (A2—mid-roll), and/or after (A3—post-roll) the target streaming content (TC). In addition, the insertion plan may identify multiple ad streams for insertion, as illustrated in FIG. 9.

As FIG. 3 illustrates, the insertion server 64 transmits DESCRIBE requests to content server 42 and ad server 62 (406) and receives corresponding DESCRIBE responses. The DESCRIBE responses typically contain information about the media streams, such as file types, supported codecs, and the like. Insertion server 64 uses this information to determine whether the media streams of content server 42 and ad server 62 are compatible for insertion. If the media streams are not compatible for insertion (408), insertion server 64 proxies the content stream and provides it to media stream client 25 without insertion of one or more ad streams (409).

If the media streams are compatible for insertion, however, insertion server 62 combines information from the DESCRIBE responses and transmits a single DESCRIBE response to media stream client 25 (410). Combining information in the DESCRIBE response can involve operations that include aggregating temporal parameters, such as the total time of the stream based on the time length of the target content stream and the time length of the ad content stream. For example, if the time length of the target content is 1 minute, and the time lengths of the ad streams A1, A2 and A3 are 20 seconds, 15 seconds and 30 seconds, respectively, the total time parameter in the DESCRIBE response transmitted to media stream client 25 will be 02:05 (MM:SS). With reference to the insertion plan illustrated in FIG. 9, the aggregate stream provided to media stream client 25 comprises multiple segments from disparate sources that are transparently combined by insertion server 64.

In a particular implementation, media stream client 25, after receiving the DESCRIBE response, transmits SETUP messages for both the audio and video portions of the multimedia stream. Insertion server 64, responsive to the SETUP messages (412), accesses the insertion plan to identify the first stream source (414). In the scenario illustrated in FIG. 3, for example, the ad stream is inserted at the start of the target content stream (e.g., pre-roll). Accordingly, insertion server 64 transmits SETUP messages (audio/video), in the illustrated example, to ad server 62, and forwards SETUP responses to media stream client 25. During the SETUP phase, the insertion server 64 maps the ports it uses to receive the RTP and RTCP packets to the ports it will use to send them. In a particular implementation, there are 4 ports—two for interfacing with the media stream client 25 and two for interfacing with the streaming server 42, 62.

As FIG. 3 shows, insertion server forwards RTCP sender reports (SRs) from the ad server 62 to the media stream client 25, as well as RTCP receiver reports (RRs) from the media stream client 25 to the ad server 62. Insertion server 64 also forwards the PLAY request and PLAY response messages between media stream client and ad server 62 (416, 418). Insertion server 64 may also modify meta information in the PLAY response transmitted to media stream client 25 per the insertion plan. Typically, after transmission of a PLAY response message, the streaming server (here, ad server 62) begins transmitting the content in a series of packets (here, RTP packets), which insertion server 64 forwards to media stream client 25.

Figure 5:
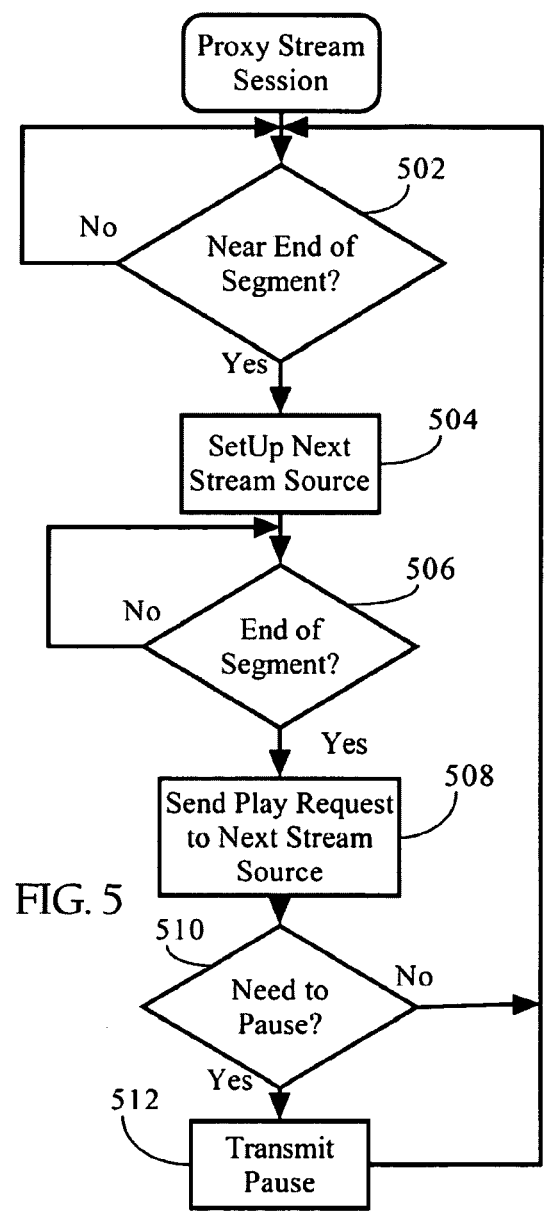
FIG. 5 is a flow chart providing another example method implemented by an insertion server.
Figure 6:
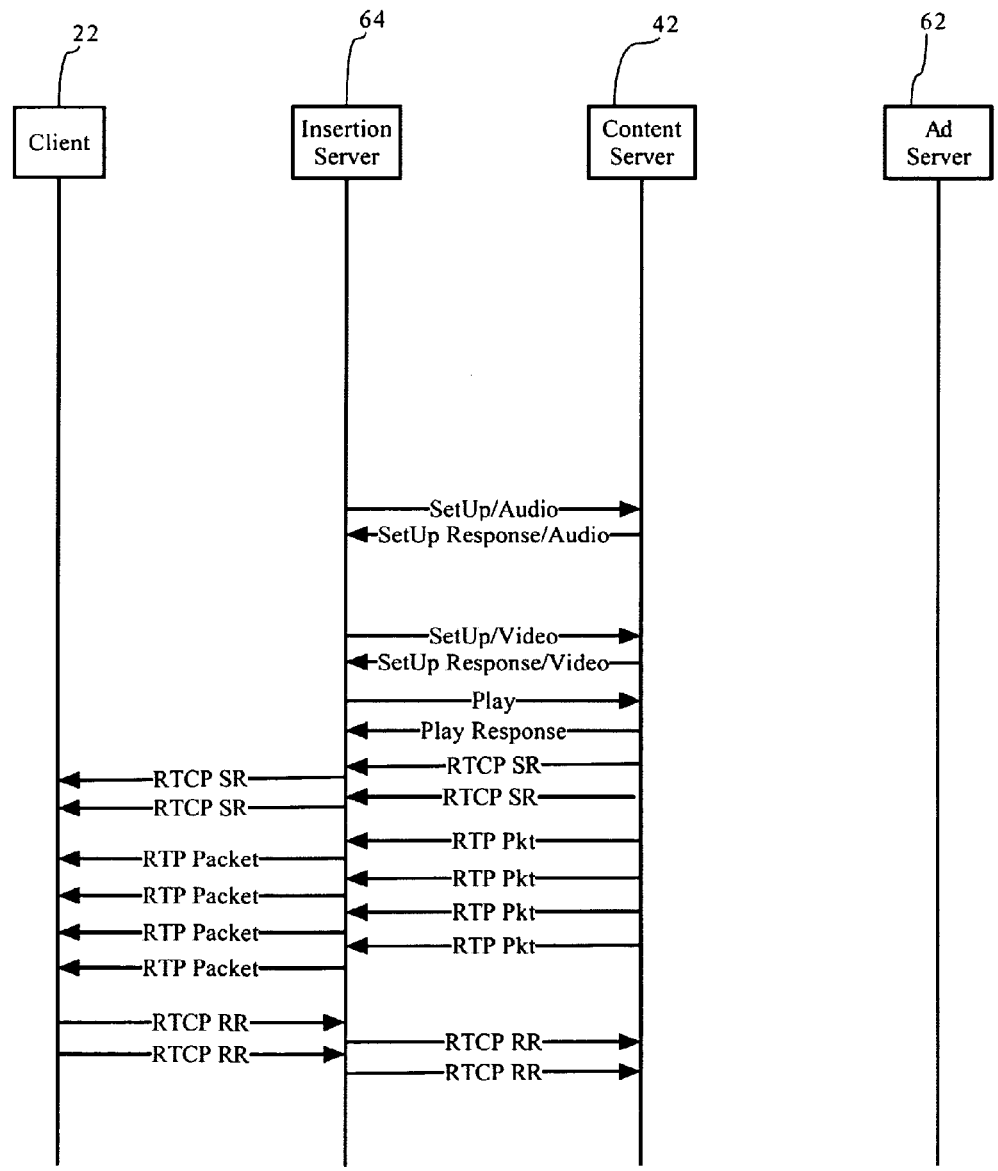
FIG. 6 is a stick diagram illustrating another example message flow between hosts.

As insertion server 64 proxies the streaming session between a streaming server and a media stream client 25 it monitors the temporal parameters of the intermediated stream relative to the insertion plan. As FIG. 5 illustrates, when the stream segment currently being streamed is near the end (502), insertion server 64 transmits SETUP messages (audio/video) to the next streaming source identified in the insertion plan (504). FIG. 6 illustrates an example message flow where content server 42 is the next streaming source. When the end of the current segment is reached, insertion server 64 transmits a PLAY request to the next streaming source (508) (here, content server 42) and then forwards the RTP packets transmitted by the next streaming source to media stream client 25. In the insertion plan illustrated in FIG. 9, the ad streams essentially play to their respective ends, while in mid-roll insertion scenarios, the target content stream is interrupted. Accordingly, to effect a mid-roll insertion, insertion server 64 determines whether the current stream source should be paused (510) and if so, transmits a pause command to the stream source (512). For example, at the end of the stream segment of target content TC (defined by the start of ad stream A2), insertion server 64 would transmit a PAUSE command to content server 42. At the end of the segment defined by ad stream A2, insertion server 64 would transmit a PLAY request to content server 42 causing it to resume transmission of the target content stream. In addition, insertion server 64 can also exchange session tear-down messages with a given streaming server if the end of the content hosted by that server has been reached.

Figure 7:
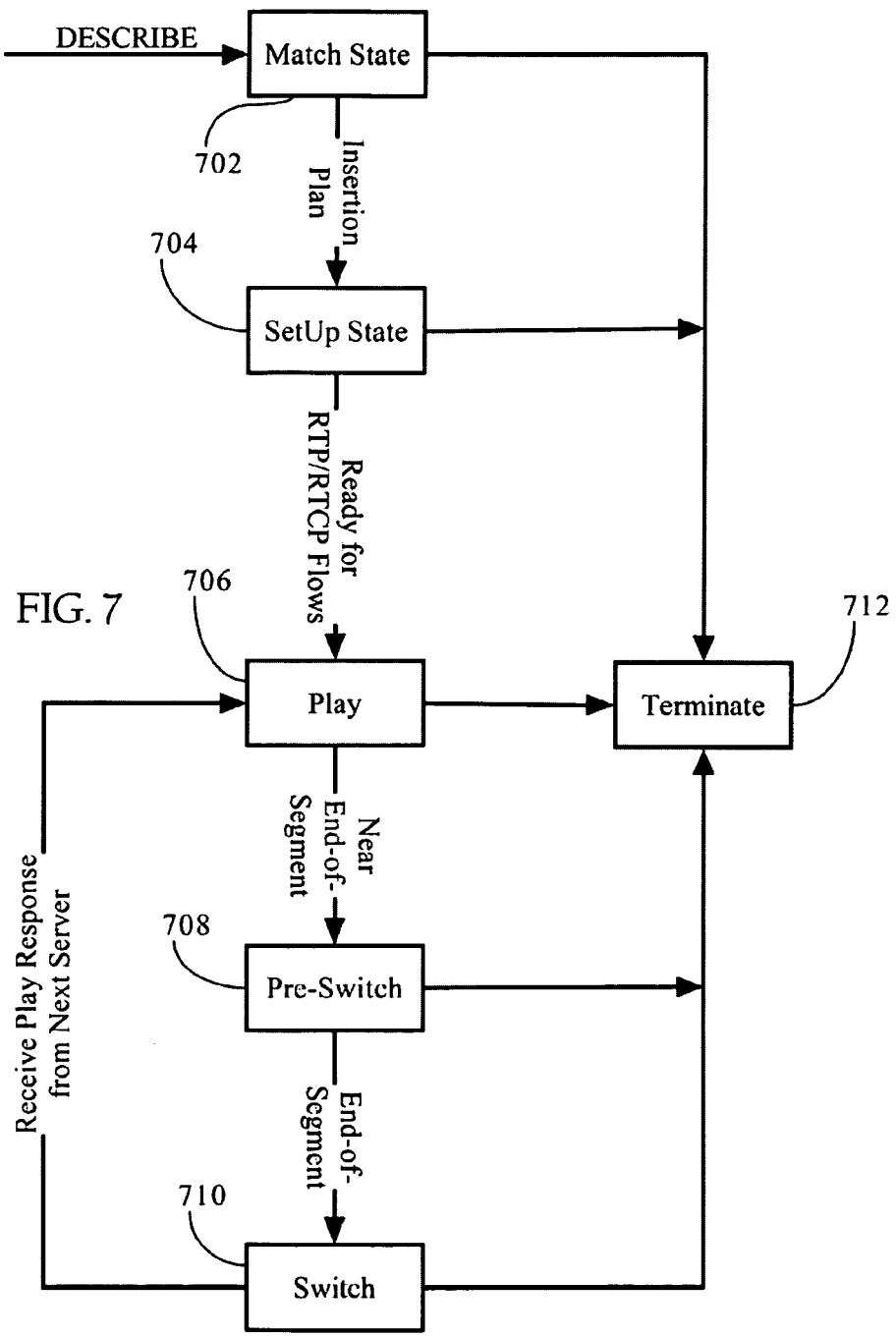
FIG. 7 is a state diagram illustrating operational states of an insertion server according to one implementation of the invention.

FIG. 7 illustrates a state machine implemented by the insertion server 64. The states of the state machine control how control messages are forwarded between clients and servers, as well as other message processing operations. In response to a DESCRIBE request from a media stream client, insertion server 64 enters the match state 702. Generation of an insertion plan causes insertion server 64 to enter the set-up state 704. In the set-up state, RTSP commands (e.g., DESCRIBE, SETUP, PLAY) flow between media stream client 25 and one or more streaming servers. When the media stream client 25 and current stream source are ready, insertion server 64 enters the play state 706. In this state, RTP or other data stream packets, as well as control packets (e.g., RTSP packets), flow between the current streaming server and the media stream client 25. Nearing the end of a given segment (see above) causes insertion server 64 to enter a pre-switch state 708. In the pre-switch state 708, RTSP command messages between media stream client 25 and the current streaming server continue to flow; however, the SETUP command messages are transmitted to the next streaming server and SETUP responses are not forwarded to media stream client 25. Reaching the end of a given stream segment causes insertion server 64 to enter the switch state 710. In the switch state 710, insertion server 64 buffers RTSP commands received from the client until the play state 706 is re-entered upon receipt of the PLAY response message transmitted by the insertion server 64 to the next streaming server. Lastly, insertion server 64 may enter a terminate state 712 in response to various events, such as unrecoverable errors, the end of the insertion plan, and the like.

In determining whether the end of a segment is near, insertion server 64, in one implementation, monitors the RTP stream information received from the streaming servers 42 or 62 against one or more thresholds. For example, the readRTP( ) method determines when the current stream is near its end, and calls a handler.prepareForSwitch( ) method when it is close to a predefined time.

```
private final void readRTP(byte[ ] data, SelectionKey key, Tunnel tunnel, Tunnel.VirtualTunnel vt)
{
    if (RtpPacket.getPayloadType(data) != vt.sPayloadType)
    {
        s_logger.warn("Threw away a packet that doesn't match the payload type: " +
logBytes(data, data.length));
        return;
    }
    tunnel.clientBuffer.add(new Tunnel.Packet(key, data));
    tunnel.hasNewPackets = true;
```

```
if (tunnel.ready)
{
  Tunnel.Packet packet = tunnel.clientBuffer.get(0);
  packet.key.interestOps(SelectionKey.OP_READ | SelectionKey.OP_WRITE);
}
if (!tunnel.prepareCalled && vt.prepareTimestamp < RtpPacket.getTimestamp(data))
{
  tunnel.prepareCalled = true;
  RtspHandler handler = tunnel._session.getHandler( );
  if (handler != null)
  {
    handler.prepareForSwitch(tunnel._session);
  }
}
helixHandling(tunnel, vt, RtpPacket.getSSRC(data));
}
```

In the foregoing code segment, vt.prepareTimestamp is computed based on the information in the DESCRIBE response transmitted by the streaming server 42 or 62 hosting the current stream. The vt.prepareTimestamp variable represents a threshold RPT time. When the RTP timestamp of a received RTP packet exceeds this threshold, the insertion server 64 monitors more aggressively for the end of the current stream segment, and prepares the next stream source as well. The handlePlayResponse( ) method set forth in section C.1., below, shows that insertion server 64 may compute the ending RTO timestamp value by accessing the sampling rate in the DESCRIBE response (sampleRate=server.getSampleRate(type), multiplying the sampling or clock rate by the length of the time length of the segment [(endTime−beginTime)*(double)sampleRate)] and adding it to the starting RTP timestamp value (rtptime). The beginning and ending time values can be based on the insertion plan and/or in information contained in DESCRIBE responses. The prepareTimestamp value is set by computing the time length of the segment and subtracting a configured about (prepareTime=endTime−beginTime−_prepareTime), and then incrementing the rtptime by the product of prepareTime and the sampling rate, as shown in the following code segment.

```
long prepare=rtptime;
    double prepareTime=endTime−beginTime−_prepareTime;
    if (prepareTime>0)
    {
      prepare+=prepareTime*(double)sampleRate;
    }
```

In addition, another method or process may also monitor for receipt of RTP packets for each of the streams intermediated by the insertion server 64. If RTP packets are not received after a threshold period of time for a given stream and the latest RTP timestamp is near the ending RTP timestamp value computed above, the insertion server 64 may switch to the next stream identified in the insertion plan.

C. Modification of Media Stream Session Parameters

As discussed above, the insertion server 64 proxies RTP, RTSP, and RTCP connections and modifies various parameter information contained in messages passed between media stream clients and servers to maintain the transparency of the insertion operations relative to the media stream clients and servers. For example, the insertion server 64 modifies the time length in DESCRIBE responses transmitted to streaming media client 25 to account for the insertion of ad content into the target content requested by the client 25. Additionally, insertion server 64 may modify certain temporal or sequence number information in messages, as well. As a result, media stream client 25 receives stream parameter information that has been adjusted due to the insertion of content into target content, while the streaming servers 42 or 62 operate in connection with their native stream parameters. Insertion server 64 translates between the insertion-adjusted parameters of the media stream client 25 to the native media stream parameters of streaming servers 42 or 62 for various RTP, RTSP and RTCP messages.

In addition to the foregoing, insertion server 64 may also modify one or more stream description or other parameters in the messages transmitted between media stream client 25 and media streaming servers 62, 42 to disable one or more optimization operations of a media gateway 34. For example, insertion server 64 may modify the description of the media types to disable caching of the stream at media gateway 34 for subsequent requests for the same target content to ensure that new source content can be inserted into the target content for the same or other users.

C.1. Modification of DESCRIBE Response

For example, the insertion server 64 modifies temporal information in the DESCRIBE response in light of the insertion plan. The following pseudocode illustrates computation of a new time length for the describe response transmitted to a media stream client 25 according to one possible implementation. In RTSP communications, the insertion server 64 combines all of the length of time parameter information, which is marked off with the header of "range" in the describe responses received from the streaming servers 42, 62. The following code segment demonstrates how the time length information is identified and aggregated.

```
public double getTotalNPT( )
{
  double npt=0.0;
  for (EndPoint ep: _streams)
  {
    String value=(String)ep.info.getAttribute("range");
    try
    {
      value=value.substring(value.lastIndexOf("-")+1)
        .trim( );
      double time=Double.parseDouble(value);
      ep.previousNPT=npt;
      npt+=time;
    }
    catch (NumberFormatException e)
    {
      throw new RtspException("Can't find time:"+
        value, this);
    }
  }
  _clientEndPoint.npt=npt;
  return npt;
}
```

In addition, the following code segment illustrates how the temporal information can be generated for the DESCRIBE response transmitted to media stream client 25.

```
while (true)
{
  beginIdx=buf.indexOf("a=range:npt=", beginIdx)+12;
  if (beginIdx==11)
  {
    break;
  }
  beginIdx=buf.indexOf("-", beginIdx);
  if (beginIdx==-1)
  {
    throw new RtspException("Can't parse the npt:"+
       buf.toString( ), this);
  }
  beginIdx++;
  int endIdx=buf.indexOf("\r\n", beginIdx);
  if (endIdx==-1)
  {
    throw new RtspException("Can't parse the end
       marker for the npt:"+buf.toString( ), this);
  }
  buf.replace(beginIdx, endIdx, Double.toString(npt));
}
```

The following code segment illustrates how the "Content-length" attribute of the DESCRIBE response header may be modified.

```
int size=buf.length( )-butindexOf("\r\n\r\n")-4;
beginIdx=buf.indexOf("Content-length:")+16;
endIdx=butindexOf("\r\n", beginIdx);
buf.replace(beginIdx, endIdx, Integer.toString(size));
```

C.2. Modification of Other RTSP Parameter Information

For all RTSP messages after the DESCRIBE phase, insertion server 64 modifies one or more of the following parameters in messages transmitted between streaming servers and clients: 1) CSEQ count, 2) Session ID, 3) time, and 4) URL to the stream. Each client request carries a sequence number in the CSeq header, which is incremented by one for each distinct request transmitted. A response to the request typically includes the same CSeq number. Since the insertion server 64 draws streaming content from two or more sources, it translates the CSeq numbers in requests transmitted from the client into appropriate Cseq numbers that each of the streaming servers would expect. Still further, a streaming media client 25 only maintains one Session ID for the streaming session; however, the insertion server 64 maintains separate streaming sessions, each with unique Session IDs, with the streaming servers 42, 62. Accordingly, insertion server 64 changes the session IDs in the messages to the respective session IDs maintained by the clients and servers. Time refers to the elapsed time typically presented to users in a media streaming client application interface. RTSP commands, such as PLAY, typically identify a time parameter. As illustrated below, insertion server 64 maps the time parameter space of the streaming media client 25 to the time parameter space of the streaming servers 42, 62 as appropriate.

The following example event sequence illustrates, for didactic purposes, operation of the insertion server 64 according to one implementation of the invention.

A) Media Stream Client 25, at start of stream, sends to Insertion Server 64---->SessionID=ABDEEER; CSEQ=2; TIME=0;

B) Insertion Server 64 determines the TIME equates to Ad Server 62, and sends to Ad Server 62---->SessionID=443222; CSEQ=2; TIME=0;

C) Insertion Server 64 modifies the response transmitted to Media Stream Client 25 with---->SessionID=ABDEEER; CSEQ=2; TIME=0;

D) Sometime later, Media Stream Client 25 sends another command to Insertion Server 64---->SessionID=ABDEEER; CSEQ=10; TIME=35;

E) Insertion Server 64 determines that TIME equates now to content server 42, and sends to content server 42----> SessionID=FFDDSSSS; CSEQ=2; TIME=1; and F) Insertion Server 64 modifies the response transmitted to Media Stream Client 25 with---->SessionID=ABDEEER; CSEQ=10; TIME=35.

As the foregoing illustrates, the insertion operations performed by insertion server 64 are transparent to media stream client 25. For example, CSEQ, relative to what media stream client 25 sees, increments sequentially, the session ID remains the same, and the temporal parameters are modified to the time spaces maintained by the client and servers. The insertion operations are also transparent to the streaming servers 42, 62. For example, the CSEQ value in event E is modified to 2 (1 is used in the DESCRIBE phase) and TIME is adjusted to be at the right time in the stream hosted by content server 42. Furthermore, the session id is adjusted as well.

The following code segment illustrates how insertion server 64 may modify one or more of the RTSP parameters set forth above.

```
//First we store what was sent to insertion server.
  public void storeCSeq(StringBuilder buf, RtspSession session, EndPoint client, EndPoint server)
  {
    int beginIdx = buf.indexOf("CSeq: ") + 6;
    int endIdx = buf.indexOf("\r\n", beginIdx);
    int cseq = 0;
    try
    {
      client.cseq = Integer.parseInt(buf.substring(beginIdx, endIdx));
      cseq = server.getCSeq(true);
    }
    catch(NumberFormatException e)
    {
      throw new RtspException("Cannot find CSeq: " + buf.substring(beginIdx, endIdx), session);
    }
    buf.replace(beginIdx, endIdx, Integer.toString(cseq));
    beginIdx = buf.indexOf("Session: ") + 9;
    if (beginIdx > 9)
    {
      endIdx = buf.indexOf("\r\n", beginIdx);
      buf.replace(beginIdx, endIdx, server.sessionId);
    }
    beginIdx = buf.indexOf("User-Agent: ") + 12;
    if (beginIdx > 11)
```

```
        {
            endIdx = buf.indexOf("\r\n", beginIdx);
            buf.replace(beginIdx, endIdx, session.getDevice( ).getUserAgent( ));
        }
    }
//Then insertion server restores it.
    protected void restoreClientCSeq(StringBuilder buf, RtspSession session)
    {
        EndPoint ep = session.getClientEndPoint( );
        int beginIdx = buf.indexOf("Cseq: ") + 6;
        if (beginIdx == 5)
        {
            beginIdx = buf.indexOf("CSeq: ") + 6;
        }
        int endIdx = buf.indexOf("\r\n", beginIdx);
        buf.replace(beginIdx, endIdx, Integer.toString(ep.cseq));
        beginIdx = buf.indexOf("Session: ") + 9;
        if (beginIdx > 8 && ep.sessionId != null)
        {
            endIdx = buf.indexOf("\r\n", beginIdx);
            int endIdx2 = buf.indexOf(";", beginIdx);
            if (endIdx2 != -1 && endIdx2 < endIdx)
            {
                endIdx = endIdx2;
            }
            buf.replace(beginIdx, endIdx, ep.sessionId);
        }
    }
//To replace the url
    protected void replaceUrl(StringBuilder buf, String newUrl, RtspSession session)
    {
        int beginIdx = buf.indexOf(" ") + 1;
        int endIdx = buf.indexOf(" ", beginIdx);
        String oldUrl = buf.substring(beginIdx, endIdx);
        int queryIdx = oldUrl.indexOf("?");
        if (queryIdx != 11)
        {
            oldUrl = oldUrl.substring(0, queryIdx);
        }
        session.setAttribute("client-url", oldUrl);
        buf.replace(beginIdx, endIdx, newUrl);
    }
//To replace the time in the request:
        int beginIdx = buf.indexOf("Range: npt=");
        if (beginIdx != -1)
        {
            beginIdx += 11;
            int endIdx = buf.indexOf("-", beginIdx);
            double beginNPT = 0.0;
            try
            {
                beginNPT = Double.parseDouble(buf.substring(beginIdx, endIdx).trim( ));
            }
            catch (NumberFormatException e)
            {
                throw new RtspException("Can't parse the begin NPT: " + buf.substring(beginIdx, endIdx),
session);
            }
            DecimalFormat format = new DecimalFormat("0.000000");
            beginNPT -= server.previousNPT;
            buf.replace(beginIdx, endIdx, format.format(beginNPT));
            beginIdx = buf.indexOf("-", beginIdx) + 1;
            endIdx = buf.indexOf("\r\n", beginIdx);
            double npt = server.npt;
            buf.replace(beginIdx, endIdx, format.format(npt));
        }
//To replace the time in the response.
    protected void handlePlayResponse(byte[ ] data, Link link)
    {
        RtspSession session = link.getSession( );
        EndPoint client = session.getClientEndPoint( );
        EndPoint server = session.getServerEndPoint(link);
        String trackName = "/" + server.trackName + "=";
        String response = new String(data);
        StringBuilder newResponse = new StringBuilder(response);
        int beginIdx = StringUtil.indexOfIC(newResponse, "Range:");
        if (beginIdx == -1)
        {
            throw new RtspException("Can't parse out the NPT: " + newResponse, session);
        }
```

-continued

```
        beginIdx = StringUtil.indexOfIC(newResponse, "npt=", beginIdx + 6);
        if (beginIdx == −1)
        {
            throw new RtspException("Can't parse out the NPT: " + newResponse, session);
        }
        beginIdx += 4;
        int endIdx = newResponse.indexOf("\r\n", beginIdx);
        String[ ] tokens = newResponse.substring(beginIdx, endIdx).split("−");
        double beginTime = 0.0;
        double endTime = 0.0;
        try
        {
            if (tokens.length == 2)
            {
            beginTime = Double.parseDouble(tokens[0]);
            endTime = Double.parseDouble(tokens[1]);
            }
            else if (tokens.length == 3 && tokens[0].length( ) == 0)
            {
            beginTime = 0.0;
            endTime = Double.parseDouble(tokens[2]);
            }
            else
            {
                throw new RtspException("Can't parse out the NPT: length = " + tokens.length + " response = 
"+ newResponse, session);
            }
        }
        catch (NumberFormatException e)
        {
            throw new RtspException("Can't parse out the NPT: " + newResponse, session);
        }
        String nptRange = " " + (beginTime + server.previousNPT) + "−" +
(Double)session.getAttribute("npt");
        newResponse.replace(beginIdx, endIdx, nptRange);
        restoreClientCSeq(newResponse, session);
        int rtpInfoIdx = newResponse.indexOf("RTP-Info: url=") + 14;
        beginIdx = rtpInfoIdx;
        if (rtpInfoIdx != 13)
        {
          try
          {
            Tunnel tunnel = session.getTunnel( );
            endIdx = newResponse.indexOf(trackName, rtpInfoIdx);
            int trackIdx = newResponse.indexOf(";", endIdx + trackName.length( ));
            int trackId = Integer.parseInt(newResponse.substring(endIdx + trackName.length( ), trackIdx));
            int seqNum = Integer.parseInt(newResponse.substring(trackIdx + 5, newResponse.indexOf(";", 
trackIdx + 5)));
            int type = server.getType(trackId);
            int[ ] clientTrack = client.getTrackInfo(type);
            newResponse.replace(endIdx + 1, trackIdx, "trackID=" + clientTrack[4]);
            String clientUrl = client.url;
            newResponse.replace(beginIdx, endIdx, clientUrl);
            beginIdx = newResponse.indexOf("rtptime=", beginIdx) + 8;
            endIdx = newResponse.indexOf(",", beginIdx);
            long rtptime = 0;
            rtptime = Long.parseLong(newResponse.substring(beginIdx, endIdx));
            if (session.getState( ) == State.SETUP)
            {
                tunnel.initVirtualTunnelClientStatistics(type, seqNum, rtptime);
            }
            int sampleRate = server.getSampleRate(type);
            long end = (long)((endTime − beginTime) * (double)sampleRate) + rtptime;
            long prepare = rtptime;
            double prepareTime = endTime − beginTime − _prepareTime;
            if (prepareTime > 0)
            {
                prepare += prepareTime * (double)sampleRate;
            }
            logDebug(session, "Tunnel Init #1: " + "type=" + type + ", seqNum=" + seqNum + ", rtptime=" +
rtptime + ", end=" + end + ", endTime=" + endTime + ", beginTime=" + beginTime);
            tunnel. initVirtualTunnelServerStatistics(type, seqNum, rtptime, end, endTime − beginTime, 
sampleRate, prepare);
            session.recordTime(trackId, beginTime, endTime, rtptime, seqNum);
            beginIdx = newResponse.indexOf("url=", endIdx) + 4;
            endIdx = newResponse.indexOf(trackName, beginIdx);
            trackIdx = newResponse.indexOf(";", endIdx + trackName.length( ));
            trackId = Integer.parseInt(newResponse.substring(endIdx + trackName.length( ), trackIdx));
            seqNum = Integer.parseInt(newResponse.substring(trackIdx + 5, newResponse.indexOf(";", 
trackIdx + 5)));
```

```
        type = server.getType(trackId);
        clientTrack = client.getTrackInfo(type);
        newResponse.replace(endIdx + 1, trackIdx, "trackID=" + clientTrack[4]);
        newResponse.replace(beginIdx, endIdx, clientUrl);
        beginIdx = newResponse.indexOf("rtptime=", beginIdx) + 8;
        endIdx = newResponse.indexOf("\r\n", beginIdx);
        rtptime = Long.parseLong(newResponse.substring(beginIdx, endIdx));
        type = server.getType(trackId);
        if (session.getState( ) == State.SETUP)
        {
            tunnel. initVirtualTunnelClientStatistics(type, seqNum, rtptime);
        }
        sampleRate = server.getSampleRate(type);
        end = (long)((endTime − beginTime) * (double)sampleRate) + rtptime;
        logDebug(session, "Tunnel Init #2: " + "type=" + type + ", seqNum=" + seqNum + ", rtptime=" +
rtptime + ", end=" + end + ", endTime=" + endTime + ", beginTime=" + beginTime);
        prepare = rtptime;
        prepareTime = endTime − beginTime − _prepareTime;
        if (prepareTime > 0)
        {
            prepare += prepareTime * (double)sampleRate;
        }
        tunnel.initVirtualTunnelServerStatistics(type, seqNum, rtptime, end, endTime − beginTime,
sampleRate, prepare);
        s_relayMgr.setupTunnel(session, tunnel);
        tunnel.ready( );
        session.recordTime(trackId, beginTime, endTime, rtptime, seqNum);
    }
    catch (NumberFormatException e)
    {
        throw new RtspException("can't find the rtptime: " + newResponse.substring(beginIdx, endIdx),
session);
    }
    }
    State state = session.getState( );
    if (state == State.SETUP || state == State.PLAY || state == State.PREPARESWITCH)
    {
        client.link.sendData(newResponse.toString( ).getBytes( ));
    }
    if (state == State.SETUP || state == State.SWITCH)
    {
        session.setState(State.PLAY);
    }
    processSwitchBuffer(session);
}
```

As the foregoing illustrates, the operation of insertion server 64 is response to the state machine discussed above. Client-generated commands, like PAUSE and PLAY, are modified such that they are forwarded to the current stream source; and the time values are modified to translate from the insertion-adjusted time that the media stream client 25 sees, to the raw or native time according to which the current stream source operates. In the PLAY state, insertion server 64 modifies the ports, track identifier (trackid), UDP ports and sequence numbers in the PLAY responses transmitted to media stream client 25. In addition, for SET-UP operations, the insertion server 64 spoofs the client, copying headers of the messages transmitted by, the client (including attributes such as user agent identifiers and the like). In addition, in the SETUP state, the insertion server 64 adjusts the client UDP ports to match the UDP ports of the streaming servers 42, 62.

C.3. Modification of RTP Parameter Information

Insertion server 64, in one particular implementation, is also operative to modify the packet sequence number and time code information in the media packets, such as RTP packets, streamed to media stream client 25. As shown below, insertion server 64 modifies the sequence number and time code information to present, relative to media stream client 25, such that the different media streams appear as one unified stream. In some implementations, insertion server 64 also modifies synchronization source (SSRC) information in RTP packets to present a single unique SSRC value to media stream client 25 when RTP packets from any of the streaming sources are forwarded. The following code segment corresponds to an adjustPacket( ) method that insertion server 64 may implement to adjust RTP parameter information.

```
private final void adjustPacket(byte[ ] data, Tunnel.Virtual-
    Tunnel vt, RtspSession session)
{
    if (s_logger.isDebugEnabled( ))
    {
        s_logger.debug("packet before:"+RtpPacket.getPay-
            loadType(data)+":"+RtpPacket.getSSRC(data)+
            ":"+RtpPacket.getSequenceNumber(data)+":"+
            RtpPacket.getTimestamp(data));
    }
    RtpPacket.replace(data,    NumbersUtil.longToBytes
        (vt.cSsrc), vt.cPayloadType, RtpPacket.getSequen-
        ceNumber(data)−vt.sBaseSequenceNumber+vt.c-
        BaseSequenceNumber,    RtpPacket.getTimestamp
        (data)−vt.sBaseTimestamp+vt.cBaseTimestamp);
    setMaxPacketTimestamp(vt, RtpPacket.getTimestamp
        (data));
    if (s_logger.isDebugEnabled( ))
    {
        s_logger.debug("packet  after:"+RtpPacket.getPay-
            loadType(data)+":"+RtpPacket.getSSRC(data)+
```

```
":"+RtpPacket.getSequenceNumber(data)+":"+
RtpPacket.getTimestamp(data)+":"+((RtpPacket.
getTimestamp(data)−vt.cBaseTimestamp)/
(double)vt.sampleRate));
    }
}
```

The adjustPacket( ) method accounts for the fact that packet sequence numbers do not start at zero; rather, the initial packet sequence number for a stream is random, but increases sequentially. The variable vt.sBaseSequenceNumber is the starting packet sequence number of the current streaming server 42 or 62. The variable vt.cBaseSequenceNumber is the last packet sequence number, incremented by 1, transmitted to media stream client 25 in connection with the previous stream. Accordingly, when insertion server 64 switches to another streaming source, vt.cBaseSequenceNumber is updated as well. At the start of the process, vt.cBaseSequenceNumber is set to zero or a null value. The adjustPacket( ) method finds the difference between the current packet sequence number (RtpPacket.getSequenceNumber(data)) and the first packet sequence number of the current stream source (vt.sBaseSequenceNumber), and adds the last packet sequence number transmitted to media stream client 25 in connection with the previous stream+1 (vt.cBaseSequenceNumber) so that the packets from the next stream appear to be in sequential order with the previous stream relative to media stream client 25.

Insertion server 64 also modifies time code information in a similar manner. Specifically, vt.sBaseTimestamp is the base time value of the stream. The variable vt.cBaseTimestamp is the end time value computed in connection with the previous stream. That is, vt.cBaseTimestamp is computed based on the time length information contained in DESCRIBE responses transmitted from the streaming servers 42, 62. For example, referring to the example insertion plan of FIG. 9, vt.cBaseTimestamp would be set to the time length reported by the ad content server 62 in connection with ad content (A1). At the transition from target content (TC) to ad content (A2), vt.cBaseTimestamp would be incremented by the time length corresponding to the time length of the segment of the target content (TC) transmitted to media stream client 25. At the transition from ad content (A2) to target content (TC), insertion server would increment vt.cBaseTimestamp with the time-length reported in the DESCRIBE response associated with ad content (2). In one implementation, insertion server 64 computes the last or ending RTP time stamp value of the current segment, which is used in connection with the transition state machine to enter into pre-switching and switch states (see handlePlayResponse( ), above). At a switch, vt.sBaseTimestamp is set to this computed value. As the foregoing code segment illustrates, insertion server 64 accesses the time code information in the received RTP packet (RtpPacket.getTimestamp(data)), subtracts vt.sBaseTimestamp and adds vt.cBaseTimestamp to generate the time code information for the RTP packet transmitted to media stream client 25.

C.4. Modification of RTCP Parameter Information

RTCP packets, including Receiver Reports (RRs) sent from clients to servers and Sender Reports (SRs) sent from servers to clients, also include parameter information that should be modified to render the insertion operations transparent to media stream client 25 and streaming servers 42, 62. RTCP packets typically include SSRC identifiers, time stamp data, and packet sequence number information. The following code segment illustrates how insertion server 64 may modify RTCP packets according to one possible implementation of the invention.

```
public void writeRTCP(SelectionKey key, Tunnel tunnel, Tunnel.VirtualTunnel vt) throws
IOException
    {
        if (!tunnel.ready)
        {
            return;
        }
        Tunnel.Packet pkt = null;
        try
        {
            // Processing the Sender Report.
            Iterator<Tunnel.Packet> it = tunnel.clientBuffer.iterator( );
            DatagramChannel dc = (DatagramChannel)key.channel( );
            while (it.hasNext( ))
            {
                pkt = it.next( );
                if (pkt.key != key)
                {  // key is not right. let's do that one instead.
                    pkt.key.interestOps(SelectionKey.OP_READ | SelectionKey.OP_WRITE);
                    break;
                }
                it.remove( );
                byte[ ] data = pkt.data;
                RtcpPackets packets = new RtcpPackets(data);
                if (!packets.parse( ))
                {
                    s_logger.warn("Dropped a problematic RTCP packet: " +
NumbersUtil.bytesToString(data, 0, data.length));
                    continue;
                }
                SrPacket sr = packets.getSenderReport( );
                long lsw = sr.getNTPTimeStampLSW( );
                long msw = sr.getNTPTimeStampMSW( );
                long rtp = sr.getRTPTimeStamp( );
                long ssrc = sr.getSSRC( );
                if (s_logger.isDebugEnabled( ))
```

```
        {
          s_logger.debug("RTCP Before: " + packets.toString( ));
        }
        packets.replace(msw, lsw, rtp – vt.sBaseTimestamp + vt.cBaseTimestamp,
vt.cPacketsSent, vt.cOctetsSent, vt.cSsrc, true, true, true);
        if (s_logger.isDebugEnabled( ))
        {
          s_logger.debug("RTCP After: " + packets.toString( ));
        }
        try
        {
          byte[ ] newData = packets.getBytes( );
          _buffer.clear( );
          _buffer.put(newData);
          _buffer.flip( );
          do
          {
            if (s_logger.isDebugEnabled( ))
            {
              s_logger.debug("CRTCP Write: " + vt.cRtcpAddress.toString( ) + ": " + ssrc +
":" + logBytes(newData, newData.length));
            }
            dc.send(_buffer, vt.cRtcpAddress);
          } while (_buffer.hasRemaining( ));
          tunnel.currentBytesSent += newData.length;
        }
        catch (IOException e)
        {
          s_logger.debug("Dropped an RTCP SR packet: " + logBytes(data, data.length));
        }
      }
      // Processing the Receiver Report.
      it = tunnel.serverBuffer.iterator( );
      while (it.hasNext( ))
      {
        pkt = it.next( );
        if (key != pkt.key)
        {
          pkt.key.interestOps(SelectionKey.OP_READ | SelectionKey.OP_WRITE);
          break;
        }
        it.remove( );
        byte[ ] data = pkt.data;
        RtcpPackets packets = new RtcpPackets(data);
        if (!packets.parse( ))
        {
          s_logger.warn("Dropped a problematic RTCP packet: " +
NumbersUtil.bytesToString(data, 0, data.length));
          continue;
        }
        if (s_logger.isDebugEnabled( ))
        {
          s_logger.debug("RTCP Before: " + packets.toString( ));
        }
        RrPacket rr = packets.getReceiverReport( );
        if (rr != null)
        {
          int sn = rr.getSequenceNumber( );
          packets.replace(vt.sSsrc, sn – vt.cBaseSequenceNumber +
vt.sBaseSequenceNumber, true);
        }
        if (s_logger.isDebugEnabled( ))
        {
          s_logger.debug("RTCP After: " + packets.toString( ));
        }
        try
        {
          byte[ ] newData = packets.getBytes( );
          _buffer.clear( );
          _buffer.put(newData);
          _buffer.flip( );
          do
          {
            if (s_logger.isDebugEnabled( ))
            {
              s_logger.debug("SRTCP Write: " + vt.sRtcpAddress.toString( ) + " : " +
logBytes(newData, newData.length));
            }
            dc.send(_buffer, vt.sRtcpAddress);
          } while (_buffer.hasRemaining( ));
```

```
        tunnel.currentBytesSent += newData.length;
      }
      catch (IOException e)
      {
        s_logger.debug("Dropped an RTCP RR packet");
      }
    }
    key.interestOps(SelectionKey.OP_READ);
  }
  catch (Throwable th)
  {
    if (pkt != null && pkt.data != null)
    {
      s_logger.warn("Unable to process RTCP: " + NumbersUtil.bytesToString(pkt.data, 0,
pkt.data.length), th);
    }
    else
    {
      s_logger.warn("Unable to process RTCP: ", th);
    }
  }
}
```

RTCP Sender Reports include NTP time stamps and RTP time stamps. An NTP time stamp indicates the point of time (absolute time) when a report was sent. In combination with timestamps returned in reception reports from the respective receivers, it can be used to estimate the round-trip propagation time to and from the receivers. In the implementation shown, NTP time stamps are not modified. The RTP time stamp is similar to the NTP timestamp (above), but is measured in the same units and with the same random offset as the RTP timestamps in RTP data packets. Sender reports also include the number of RTP packets transmitted by the sender since initiation of the RTP session, and the number of payload octets transmitted since initiation of the session.

As the code segment set forth above illustrates, insertion server 64 modifies the RTP time stamp information in a manner similar to the RTP packets. That is, it accesses the RTCP packet for the reported RPT time stamp [rtp=sr.getRTPTimeStamp( )], subtracts the base time stamp of the current stream source (vt.sBaseTimestamp), and adds the end time value computed in connection with the previous stream (vt.cBaseTimestamp, above). Insertion server 64 also maintains its own count of the payload octets (vt.cOctetsSent) and number of packets (vt.cPacketsSent) sent to media stream client 25 and uses these values to replace corresponding values in the Sender Report.

In addition, insertion server 64 also changes information in RTCP Receiver Reports sent from the media stream client 25 to a streaming server 42 or 62. Receiver Reports include similar metrics to Sender Reports, including RTP packet sequence numbers and synchronization source identifiers. As the foregoing code segment demonstrates, insertion server accesses the Receiver Reports to adjust the reported RTP packet sequence number [sn=mgetSequenceNumber( )] by adding the base sequence number of the current stream source (vt.sBaseSequenceNumber) and subtracting the last reported RTP sequence number in connection with the previous stream source (vt.cBaseSequenceNumber).

D. Example Server System Architecture

Figure 8:
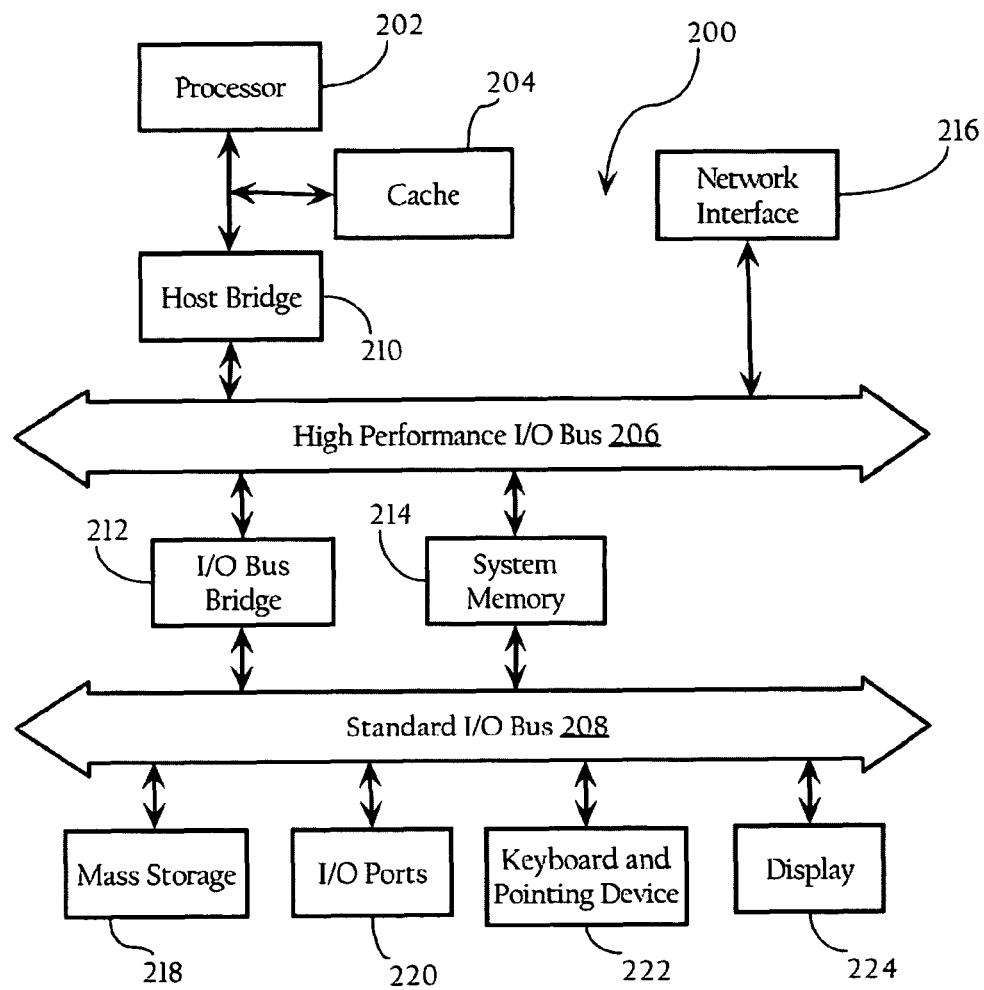
FIG. 8 is a functional block diagram illustrating an example server system architecture.

FIG. 8 illustrates, for didactic purposes, a hardware system 200, which may be used to host the functionality of insertion server 64. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device 224 coupled to the video memory. Mass storage 218 and I/O ports 220 couple to bus 208. In one embodiment, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP operating system, available from Microsoft Corporation of Redmond, Wash., the Apple Macintosh Operating System, available from Apple Computer Inc. of Cupertino, Calif., UNIX operating systems, and the like.

As described above, particular embodiments of the insertion processes described above may be executed by an insertion server. Particular embodiments of the insertion process might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiment that fall within the scope of the invention. In this regard, it will be appreciated that there are many other possible orderings of the steps in the processes described above and many possible modularizations of those orderings. It will also be appreciated that the processes are equally applicable when there are multiple source media streams, as opposed to just one source media stream, as indicated earlier. And it will be appreciated that the processes are equally applicable when a media stream has tracks in addition to a video track and an audio track. As a result, the invention is not limited to the specific examples and illustrations discussed above, but only by the following claims and their equivalents.

What is claimed is:

1. A method, comprising
receiving, at an insertion server, a request to access a first media stream from a mobile device comprising a client, wherein the first media stream is hosted by a first streaming server;
identifying, at the insertion server, a second media stream for insertion into the first media stream and an insertion point for the second media stream, wherein the second media stream is hosted by a second streaming server; and
transparently inserting, via the insertion server, the second media stream into the first media stream by:
proxying, via the insertion server, a first streaming session between the client and the first streaming server;
proxying, via the insertion server, a second streaming session between the client and the second streaming server; and
modifying, at the insertion server, stream parameter information wirelessly transmitted by the mobile device from the client and native media stream parameters transmitted by the first and second streaming servers in connection with the first and second streaming sessions to combine, via the insertion server and relative to the client, the first and second streaming sessions as a single streaming session,
wherein the native media stream parameters comprise information describing the first media stream received at the insertion server from the first streaming server and information describing the second media stream received at the insertion server from the second streaming server; and
determining, at the insertion server, whether the first media stream and the second media stream are compatible for insertion based upon, at least in part, the native media stream parameters; and combining, at the insertion server, at least part of the information describing the first media stream received at the insertion server from the first streaming server and at least part of the information describing the second media stream received at the insertion server from the second streaming server by aggregating temporal parameters of the first media stream and the second media stream.

2. The method of claim 1 wherein the first and second media streams are audio streams.

3. The method of claim 1 wherein the first and second media streams are video streams.

4. The method of claim 1 wherein the first and second streaming sessions each comprise a data connection, a control connection and a command connection.

5. The method of claim 1 wherein the native media stream parameters comprises packet sequence number information.

6. The method of claim 1 wherein the native media stream parameters comprises stream timing information.

7. The method of claim 1 wherein the native media stream parameters comprises one or more stream source identifiers.

8. The method of claim 1 further comprising controlling messages being sent to or from the second media server using a state machine implemented on the insertion server.

9. The method of claim 8, further comprising buffering Real Time Streaming Protocol commands received from the client until a play state of the state machine occurs.

10. The method of claim 1 wherein the client is a multimedia player.

11. An apparatus, comprising
one or more network interfaces;
one or more processors;
a state machine,
a media insertion module comprising computer-readable instructions stored in a physical medium, the computer-readable instructions operative, when executed, to cause the one or more processors to:
deploy an ad campaign to a mobile device;
receive, at an insertion server comprising the state machine, a request to access a first media stream from the mobile device, wherein the first media stream is hosted by a first streaming server;

identify, at the insertion server, a second media stream for insertion into the first media stream and an insertion point for the second media stream, wherein the second media stream is hosted by a second streaming server; and transparently insert, at the insertion server, the second media stream into the first media stream by:
- proxying, via the insertion server, a first streaming session between the mobile device and the first streaming server;
- proxying, via the insertion server, a second streaming session between the mobile device and the second streaming server; and
- modifying, at the insertion server, stream parameter information wirelessly transmitted by the mobile device and native media stream parameters transmitted by the first and second streaming servers in connection with the first and second streaming sessions to combine, via the insertion server and relative to the mobile device, the first and second streaming sessions as a single streaming session comprising an ad of the ad campaign, wherein states of the state machine control how control messages are forwarded between the mobile device and the first streaming server and the second streaming server, wherein the native media stream parameters comprise information describing the first media stream received at the insertion server from the first streaming server and information describing the second media stream received at the insertion server from the second streaming server; and determining, at the insertion server, whether the first media stream and the second media stream are compatible for insertion based upon, at least in part, the native media stream parameters; and combining, at the insertion server, at least part of the information describing the first media stream received at the insertion server from the first streaming server and at least part of the information describing the second media stream received at the insertion server from the second streaming server by aggregating temporal parameters of the first media stream and the second media stream.

12. A method, comprising receiving, at an insertion server, a request to access a first media stream from a media stream client installed on a mobile device, wherein the first media stream is hosted by a first streaming server;

executing a state machine implemented on the insertion server;

forwarding a control message between the mobile device and the first streaming server and a second streaming server using the state machine;

identifying, at an insertion server, a second media stream for insertion into the first media stream and an insertion point for the second media stream, wherein the second media stream is hosted by the second streaming server; and transparently inserting, via the insertion server, the second media stream into the first media stream by:
- proxying, via the insertion server, a first streaming session between the media stream client and the first streaming server;
- proxying, via the insertion server, a second streaming session between the media stream client and the second streaming server; and modifying, at the insertion server, stream parameter information wirelessly transmitted by the media stream client using the mobile device and native media stream parameters transmitted by the first and second streaming servers in connection with the first and second streaming sessions to combine, via the insertion server and relative to the media stream client, the first and second streaming sessions as a single streaming session, wherein the stream parameter information comprises temporal information, wherein the native media stream parameters comprise information describing the first media stream received at the insertion server from the first streaming server and information describing the second media stream received at the insertion server from the second streaming server; and determining, at the insertion server, whether the first media stream and the second media stream are compatible for insertion based upon, at least in part, the native media stream parameters; and combining, at the insertion server, at least part of the information describing the first media stream received at the insertion server from the first streaming server and at least part of the information describing the second media stream received at the insertion server from the second streaming server by aggregating temporal parameters of the first media stream and the second media stream.

13. The method of claim 12 wherein states of the state machine implemented on the insertion server comprises a match state, a play state, and a switch state.

14. The method of claim 12, wherein the temporal parameters of the first media stream and the second media stream include a length of the first media stream and a length of the second media stream.

* * * * *